United States Patent
Vusirikala et al.

(10) Patent No.: US 9,306,664 B1
(45) Date of Patent: Apr. 5, 2016

(54) IN-SERVICE OPTICAL SIGNAL TO NOISE RATIO MONITORING IN AN OPTICAL NETWORK

(71) Applicant: Google Inc., Mountain View, CA (US)

(72) Inventors: Vijay Vusirikala, Palo Alto, CA (US); Xiaoxue Zhao, Fremont, CA (US); Bikash Koley, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/137,079

(22) Filed: Dec. 20, 2013

Related U.S. Application Data

(60) Provisional application No. 61/782,660, filed on Mar. 14, 2013.

(51) Int. Cl.
    *H04B 10/079*       (2013.01)

(52) U.S. Cl.
    CPC ................ *H04B 10/07953* (2013.01)

(58) Field of Classification Search
    CPC ........... H04B 10/07953; H04B 10/0773; H04B 10/0775; H04B 10/07955
    USPC ............... 398/26, 93, 94, 208, 209, 214
    See application file for complete search history.

(56) References Cited

U.S. PATENT DOCUMENTS

| | | | | |
|---|---|---|---|---|
| 6,952,529 | B1 * | 10/2005 | Mittal .............................. | 398/26 |
| 2002/0154353 | A1 * | 10/2002 | Heath et al. ................... | 359/124 |
| 2008/0095058 | A1 * | 4/2008 | Dalmases et al. ............. | 370/237 |
| 2008/0291925 | A1 * | 11/2008 | Fisher et al. .................. | 370/400 |
| 2009/0080882 | A1 * | 3/2009 | Cahill ............................. | 398/26 |
| 2010/0322622 | A1 * | 12/2010 | Shukunami et al. ............ | 398/26 |
| 2011/0311222 | A1 * | 12/2011 | Nakamura et al. .............. | 398/26 |

FOREIGN PATENT DOCUMENTS

| | | | | |
|---|---|---|---|---|
| WO | WO 2009062237 A1 * | 5/2009 | .............. | H04B 10/08 |

OTHER PUBLICATIONS

Chitgarha, M.R., et al. Demonstration of WDM OSNR Performance Monitoring and Operating Guidelines for Pol-Muxed 200-Gbit/s 16-QAM and 100-Gbit/s QPSK Data Channels, Optical Fiber Communication Conference. Optical Society of America, 2013.

(Continued)

*Primary Examiner* — Dalzid Singh

(74) *Attorney, Agent, or Firm* — Foley & Lardner LLP; John D. Lanza; Edward A. Gordon

(57) ABSTRACT

Methods, mediums and systems described herein determine real-time in-service OSNR measurement without disrupting or turning off one or more channels of the network. An OSNR monitor described herein may be integrated with existing optical line systems. The OSNR measurements performed by the OSNR monitors are independent of the modulation format and thus, may work with all phase formats, amplitude format or a combination thereof. The real-time in-service OSNR data may be used to perform global network optimization to determine the optimal routing and data rate in the optical network. The OSNR data may be used to establish protection and restoration paths for network resiliency and to maximize data throughput.

20 Claims, 7 Drawing Sheets

(56) References Cited

OTHER PUBLICATIONS

Flood, E., et al. Interferometer Based In-Band OSNR Monitoring of Single and Dual Polarisation QPSK Signals, European Conf. on Optical Communication (ECOC), Torino, Italy (Sep. 2010).

Liu, X., et al. A Simple OSNR Monitoring Technique Independent of PMD and Chromatic Dispersion Based on A 1-bit Delay Interferometer, 2006 European Conference on Optical Communications. 2006.

* cited by examiner

IN-SERVICE OPTICAL SIGNAL TO NOISE RATIO MONITORING IN AN OPTICAL NETWORK

RELATED APPLICATIONS

The present application claims priority to a U.S. provisional Patent Application No. 61/782,660, filed Mar. 14, 2013, the contents of which are incorporated herein by reference.

BACKGROUND

Optical Signal to Noise Ratio (OSNR) refers to the ratio of an optical signal power to noise signal power in an optical network. OSNR is a key figure of merit for optical networks. In conventional optical networks, OSNR is calculated at the time of set up for the optical networks. In other words, the OSNR is calculated when an optical network is being configured for initial service. For a given link or a set of links in an optical network, the OSNR measurement is done before the link is in-service through an external test because the signal level and the noise level need to be measured separately. In order to be able to measure the noise level accurately, the signal channel is turned off so as to be able to evaluate the true in-band noise level. This conventional approach is service interrupting such that it cannot be conducted in-service.

The conventional one-time beginning-of-line OSNR measurement of a link fails to account for events occurring during operation that can affect the OSNR value. For example, amplifiers may degrade over time when the optical network is in-service. The degradation is not accounted for in the conventional OSNR measurements. In addition, optical networks may be built with add/drop nodes where some waves are transparently passed through while other waves are terminated. Conventional OSNR measurement techniques rely on segment-by-segment OSNR measurements taken at the initial time of install. End-to-end link OSNR is inferred using the segment-by-segment OSNR measurements. This approach is often error prone and practically infeasible if one segment is already in-service with waves transmitting.

SUMMARY

Embodiments described herein determine real-time in-service OSNR measurement without disrupting or turning off one or more channels of the network. An OSNR monitor described herein may be integrated with existing optical line systems. The OSNR measurements performed by the OSNR monitors are independent of the modulation format and thus, may work with all phase formats, amplitude format or a combination thereof. The real-time in-service OSNR data may be used to perform global network optimization to determine the optimal routing and data rate in the optical network. The OSNR data may be used to establish protection and restoration paths for network resiliency and to maximize data throughput.

In some embodiments, a method in an optical network is provided. The method includes tapping off a portion of an optical signal without affecting service in the optical network. The portion of the optical signal is filtered with an optical filter to select a channel in the signal. The filtered signal is passed to a delay line in interferometer (DLI). The method further includes comparing power at a constructive interference output port of the DLI with power at a destructive interference output port to calculate an optical signal to noise ratio (OSNR) for the channel. The method also includes calculating the OSNR for the channel using the power at the constructive interference output port of the DLI and the power at the destructive interference output port of the DLI.

Various embodiments provide a method, in an optical network, that includes measuring an optical signal to noise ratio (OSNR) for a channel of an optical signal for a link using a delay line interferometer. The method also includes reporting the measure OSNR for the link to a network management tool. With the network management tool, the measured OSNR is used to manage the optical network.

In some embodiments, a monitor for measuring an optical signal to noise ratio (OSNR) in an optical signal is coupled to an optical network. The monitor includes an optical filter for filtering a portion of an optical signal to select a channel in the optical signal without affecting service in the optical network. The monitor also includes a delay-line in interferometer (DLI) for measuring the OSNR in the optical signal. The DLI includes a constructive interference output port, and a destructive interference output port. The monitor further includes an OSNR calculation unit for calculating the OSNR for the channel using power at the constructive interference output port of the DLI and power at the destructive interference output port of the DLI.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Exemplary embodiments described herein overcome a number of limitations found with the conventional approach to measuring OSNR in an optical network. These exemplary approaches provide in-service OSNR measurements such that the optical signals need not be turned off and the network can be fully in-service. Thus, the exemplary embodiment overcomes one of the limitations of the conventional approach by not being service interrupting.

A further limitation of the conventional approach is that the OSNR measurements may not be accurate as the network ages. Conditions within the network may change during operation of the network so that the OSNR measurements are no longer accurate. In contrast, the exemplary embodiments enable real-time OSNR monitoring on an on-going basis while in-service to provide current OSNR information.

One approach that is employed in conventional optical networks to avoid problems with degradation in OSNR is to provide a large margin. For example, a 3 dB margin may often be provided. As an illustrative case, if the OSNR at the beginning of the network life is 18 dB, 3 dB is subtracted from 18 dB to provide a design with 15 dB to cover OSNR degradation over time. With the exemplary embodiments, the margin need not be as large and more aggressive designs may be deployed with a smaller margin to save on the cost of running the network.

Exemplary embodiments also have the benefit that they may be independent of the modulation format that is used to modulate the optical signals. Still further, the exemplary embodiments are not limited to any specific wavelength or channel grid definition, such as the wavelength grid spacing of the channel.

Figure 1:
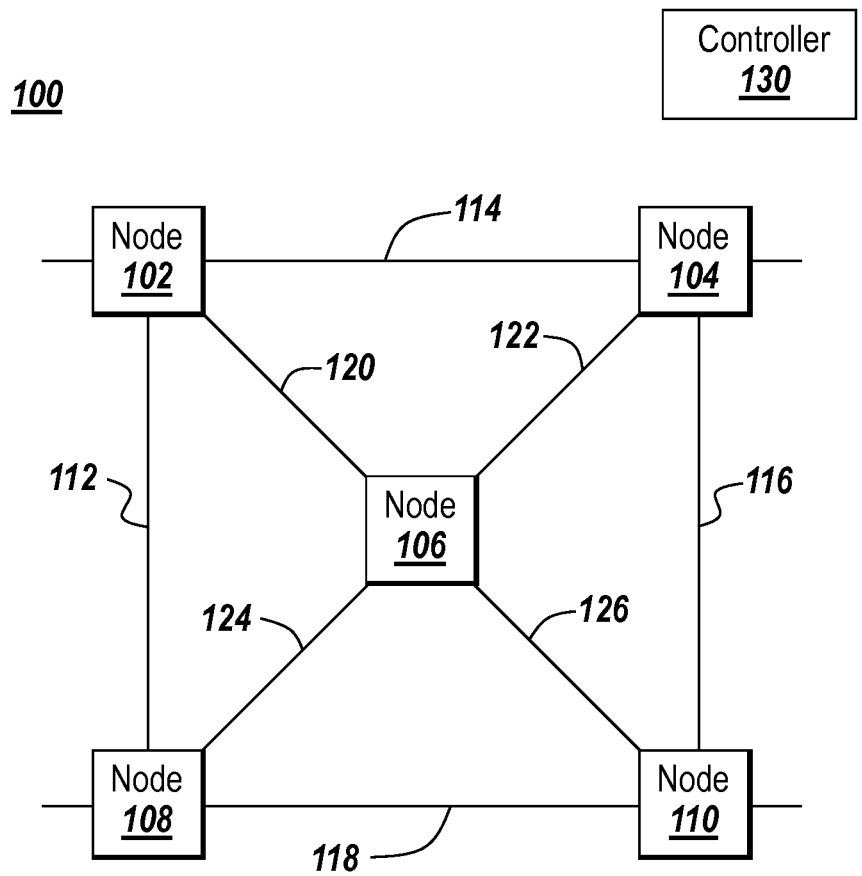
FIG. 1 is a block diagram of a portion of an optical network that may be suitable for practicing exemplary embodiments described herein.

FIG. 1 depicts a block diagram of an example optical network. This depiction is intended to be to be merely illustrative and not limiting. Different optical network topologies may be employed, and the depiction in FIG. 1 is intended to merely show a portion of the optical network.

The optical network 100 shown in FIG. 1 includes a number of nodes 102, 104, 106, 108 and 110 that provide switching or add/drop functionality. These nodes may be, for example, optical terminal nodes, optical add/drop nodes or multi-degree junction nodes. The nodes are interconnected by optical links 112, 114, 116, 118, 120, 122, 124 and 126. These links may be realized through the use of optical fibers and various amplifiers or repeaters that are positioned on the links.

In various embodiments, the OSNR measurements may be used to check the operation of the network and detect any potential network failure events. In order to better monitor the performance of the network, real-time OSNR data of the links 112, 114, 116, 118, 120, 122, 124 and 126 is feedback to a controller 130 which may determine an optimal bit rate and channel plan for transmission. Using the real-time, full-spectrum, accurate OSNR information, the controller 130 may optimize the throughput, flexibility and resiliency of the optical network 100.

Figure 2:
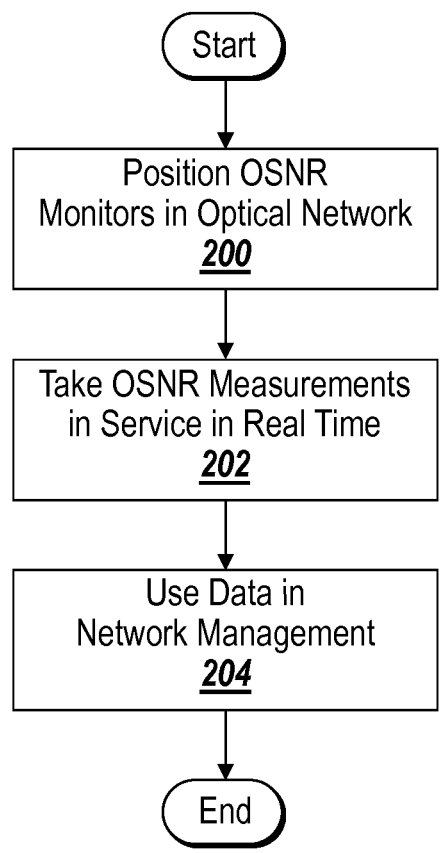
FIG. 2 is a flow chart that provides an overview of steps that may be performed in exemplary embodiments.

FIG. 2 is a flow chart that provides an overview of steps that may be performed in exemplary embodiments described herein. OSNR monitors may be positioned in an optical network, such as the optical network 100 shown in FIG. 1 (Step 200). The OSNR measurements are taken in-service in real time (Step 202). In particular the OSNR monitors are employed to calculate the OSNR for each of the links, such as the links 112, 114, 116, 118, 120, 122, 124 and 126 shown in FIG. 1. The details of calculating or determining the OSNR measurements are described below in detail in connection with FIG. 5. The OSNR measurement data may then be deployed in a number of different network management capacities as will be described in more detail below (Step 204).

Figure 3A:
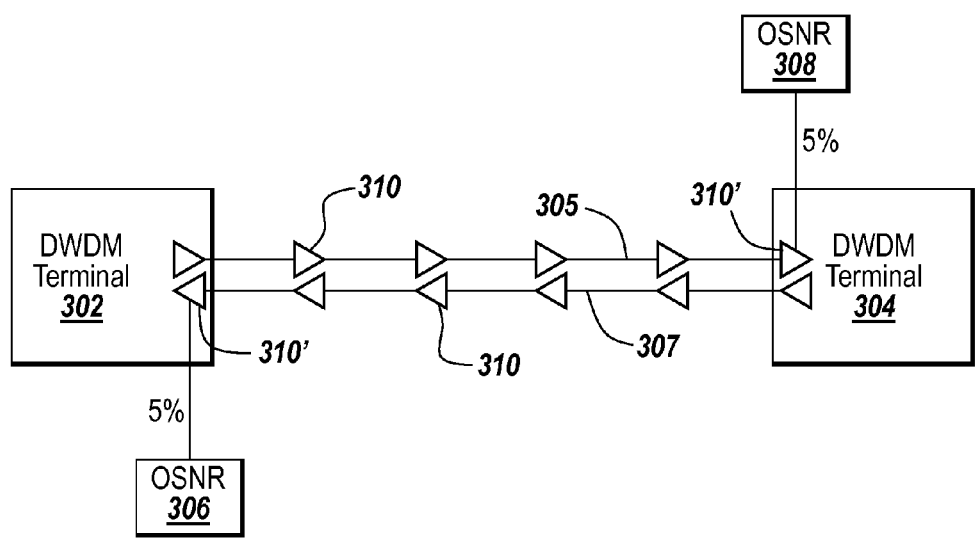
FIG. 3A depicts an example configuration for measuring OSNR in exemplary embodiments.

FIG. 3A depicts a first exemplary configuration for the OSNR monitors in an optical network. For the example depicted in FIG. 3A, it is assumed that the optical network is a dense wavelength division multiplexing (DWDM) network. Accordingly, the OSNR monitors depicted in FIG. 3A can accept DWDM signals with any number of channels as the input. In the portion of the network depicted in FIG. 3A, a first DWDM terminal 302 is connected to a second DWDM terminal 304 by lines 305 and 307 that extend between the terminals 302 and 304. Line 305 is used to carry optical signals from terminal 302 to terminal 304. Conversely, line 307 is used to carry optical signals from terminal 304 to terminal 302. Optical amplifiers 310 may be provided on the lines 305 and 307. Each line 305 and 307 includes a terminating amplifier 310'. In the embodiment of FIG. 3A, the OSNR monitors 306 and 308 are separate from the terminals 302 and 304. Optical taps take approximately 5% of the optical signals and pass the tapped portions of the optical signals to the respective OSNR monitors 306 or 308 from the last optical amplifiers 310' on the respective lines. The OSNR monitors 306 and 308 then may calculate the OSNR for the link between the terminals 302 and 304 in each direction of travel.

Figure 3B:
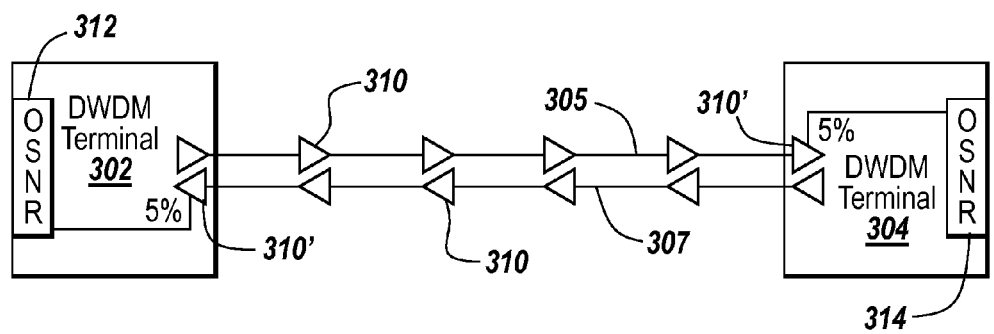
FIG. 3B depicts an alternative configuration to measuring OSNR in exemplary embodiments.

FIG. 3B depicts a second exemplary configuration for the OSNR monitors in an optical network. In FIG. 3B the OSNR monitors 312 are built into the terminals 302 and 304 rather than being separate from the terminals. For the example depicted in FIG. 3B, it is assumed that the optical network is a DWDM network. Accordingly, the OSNR monitors depicted in FIG. 3A can accept DWDM signals with any number of channels as the input. In the portion of the network depicted in FIG. 3B, a first DWDM terminal 302 is connected to a second DWDM terminal 304 by lines 305 and 307 that extend between the terminals 302 and 304. Line 305 is used to carry optical signals from terminal 302 to terminal 304. Conversely, line 307 is used to carry optical signals from terminal 304 to terminal 302. Optical amplifiers 310 may be provided on the lines 305 and 307. Each line 305 and 307 includes a terminating amplifier 310'. In the embodiment of FIG. 3B, the OSNR monitors 312 and 314 are built into the terminals 302 and 304, respectively. Optical taps take approximately 5% of the optical signals and pass the tapped portions of the optical signals to the respective OSNR monitors 312 or 314 from the last optical amplifiers 310' on the respective lines. The OSNR monitors 312 and 314 then may calculate the OSNR for the link between the terminals 302 and 304 in each direction of travel.

The optical networks illustrated in FIGS. 3A-3B are modulation format agnostic. That is, any modulation format (e.g., high capacity modulation formats such as polarization-multiplexed quadrature phase shift keying (QPSK) or quarature amplitude modulation (QAM)) is supported on each DWDM channel.

Figure 4:
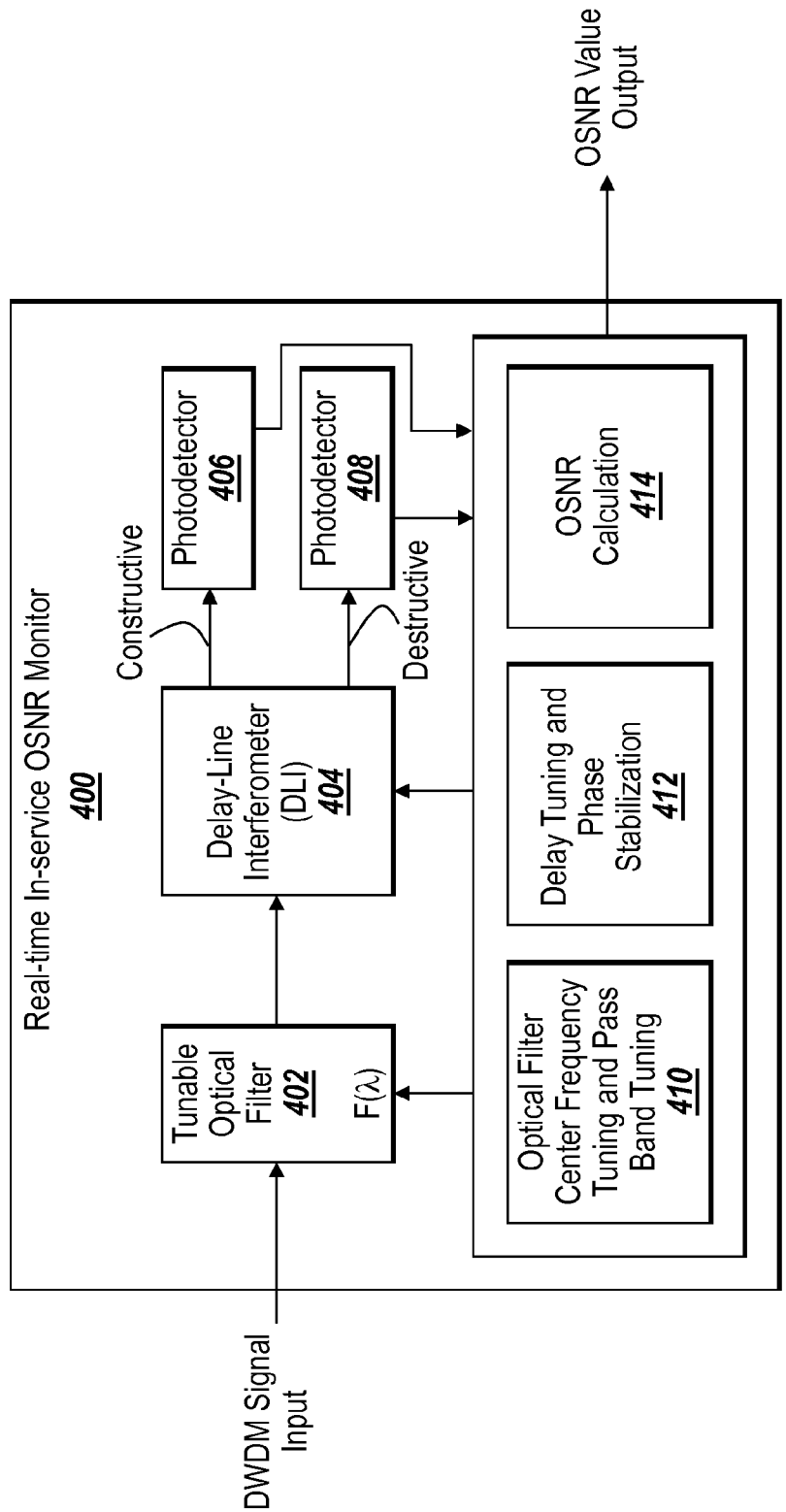
FIG. 4 depicts an OSNR monitor in more detail.

FIG. 4 depicts an exemplary OSNR monitor 400. OSNR monitor 400 includes a tunable optical filter 402 that is controlled by a tuner 410. The channel to be filtered is determined by the center frequency of the optical filter. The bandwidth of the filter may be tunable as well. The tunable optical filter 402 is connected to a delay line interferometer (DLI) 404. The DLI may be, for example, a Mach-Zehnder interferometer or a Michelson interferometer. The tuning and phase stabilization of the DLI may be controlled by a unit 412. The DLI 404 has a constructive output port and a destructive output port that are coupled to respective photodetectors 406 and 408. The constructive output port of the DLI 404 is where the two beams split within the DLI 404 are in phase and have constructive interference. The destructive port, in contrast, is where the two beams are out of phase and have destructive interference. Constructive interference occurs when the phase difference between the beams is a multiple of $2\pi$, whereas destructive interference occurs when the phase difference is an odd multiple of $\pi$. The output power of the two ports of the DLI 404 may be different. The power ratio between the output of the constructive port and the output of the destructive port is used to monitor the OSNR of the channel in question.

The photodetectors 406 and 408 convert the received optical signals into electrical signals. The values received at the photodetectors 406 and 408 maybe used to calculate the OSNR by an OSNR calculation unit 414. This OSNR value may be output from the OSNR monitor 400. In some embodiments, the OSNR calculation unit 414 may be realized in hardware through electronic circuits. Alternatively, software solutions are possible. The tuning performed by the optical filter frequency tuning and pass band tuning unit 410 and the delay tuning and phase stabilization of unit 412 may also be performed via electronic circuitry.

In the OSNR monitor 400, input power sensitivities are mainly determined by the specification of the photodetectors 406 and 408. Thus, low input power does not affect OSNR measurements and calculation as long as the photo detector is still able to report accurate power levels. As such, less than 5% of the optical signal needs to be tapped for the monitoring port. This allows the monitor to work in an in-service fashion because 95% of the signal is still deployed in-service.

Figure 5:
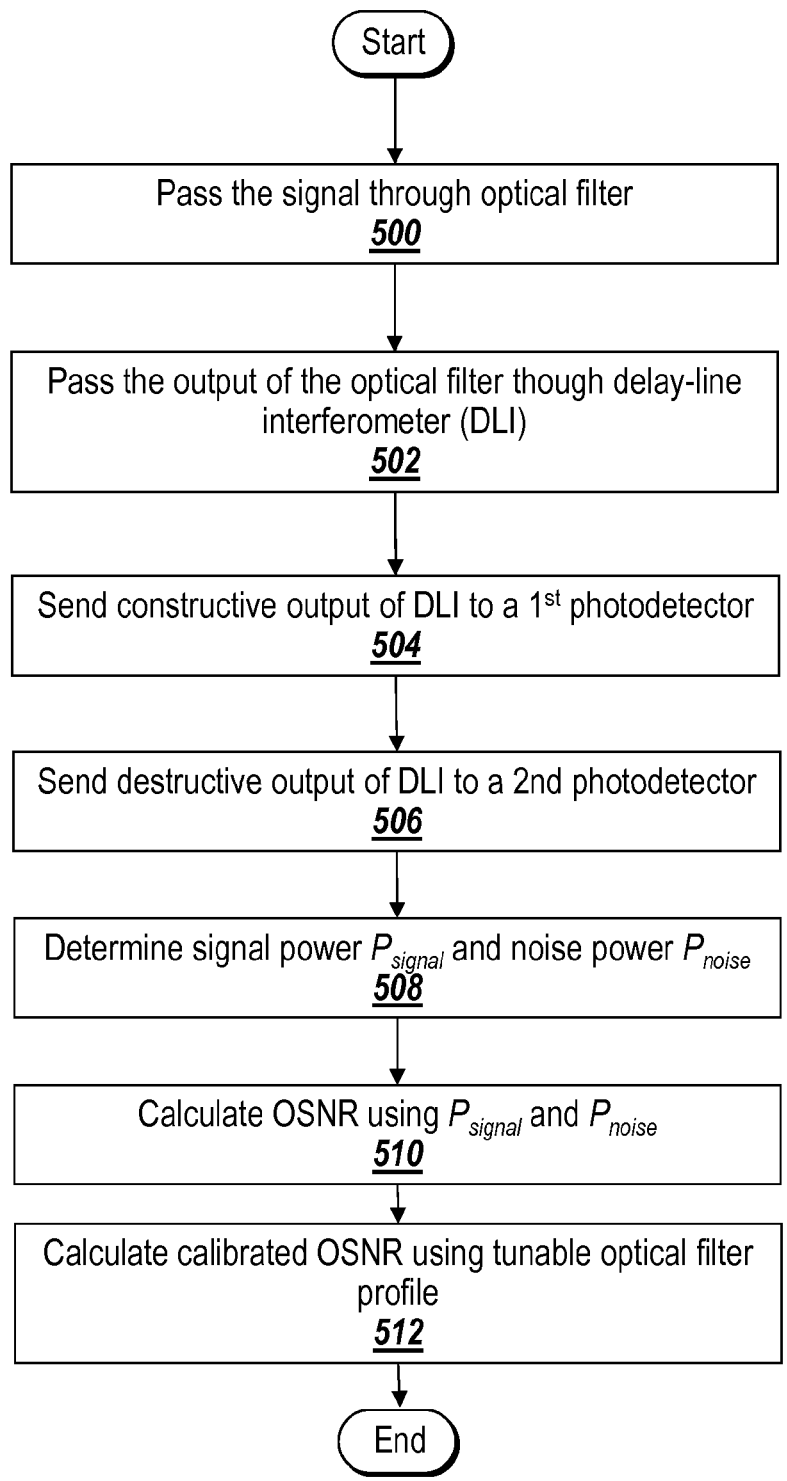
FIG. 5 is a flow chart that provides an overview of exemplary steps that may be performed in determining and calibrating OSNR in a deployed network.

FIG. 5 is a flowchart that provides an overview of exemplary steps that may be performed by an exemplary OSNR monitor, such as OSNR monitor 400, in determining and calibrating OSNR in a deployed network. In operation, the DWDM signal input passes through the optical filter (step 500). The tuner is tuned to filter out one particular signal channel for the OSNR measurement (i.e. channel under test). The channel under test is selected by changing the center frequency of the tunable optical filter. According to various embodiments, any DWDM channel may be filtered if the filter center frequency is tunable.

At step 502, the output of the optical filter passes through the DLI. As discussed above in connection with FIG. 4, the output of DLI has two ports: a constructive port and a destructive port. The constructive output of the DLI is sent to a first photodetector (step 504). The destructive output of the DLI is sent to a second photodetector (step 506).

Since the signal is coherent, i.e. has a well defined phase information, and the noise is not coherent, the constructive and destructive interference happens for the signal only. The noise gets equally split between the constructive port and the destructive port. At step 508, the direct measured signal power $P_{signal}$ and the noise power $P_{noise}$ may be expressed as:

$$P_{signal} = (\alpha+1)(P_{const} - \beta P_{dest})/(\alpha-\beta)$$

$$P_{noise} = (\beta+1)(\alpha P_{dest} - P_{const})/(\alpha-\beta)$$

where $P_{const}$ is the power measured at the constructive port and $P_{dest}$ is the power measured at the destructive port, $\alpha$ is the power ratio of $P_{const}/P_{dest}$ when the input is signal only (no noise), and $\beta$ is the power ratio of $P_{const}/P_{dest}$ when the input is noise only (no signal). $\alpha$ and $\beta$ are fixed parameters determined by the characteristics of the optical filter 402 and the DLI 404 which can be calibrated during manufacturing and hardcoded into each OSNR monitor 400. $\alpha$ is the ratio of the power in the constructive port to the power in the destructive port as measured for a coherent signal. $\alpha$ is calibrated at the time of initial deployment and once it is calibrated, it remains fixed for a particular setting of DLI delay setting. $\beta$ is the ratio of the power in the constructive port to the power in the destructive port as measured for noise. $\beta$ is calibrated at the time of initial deployment and once it is calibrated, it remains fixed for a particular setting of DLI delay setting.

At step 510, OSNR then can be calculated using $P_{signal}$ and $P_{noise}$. However, the industry standard definition of OSNR specifies measurement bandwidth of 0.1 nm for the noise. To ensure that the OSNR monitor reports an OSNR value compliant to the industry standard definition and compatible with measurement done using other techniques, such as the traditional out-of-band measurement, the value needs to be further calibrated based on the filter profile of the optical filter 402. Given that the noise spectrum is flat and wavelength-independent, the total noise power is determined by the optical filter profile:

$$P_{noise} = N \int_{\lambda_1}^{\lambda_2} F(\lambda) d\lambda$$

$$P_{noise-cal} = 0.1 * P_{noise} / \int_{\lambda_1}^{\lambda_2} F(\lambda) d\lambda$$

$$OSNR = P_{signal}/P_{noise-cal}$$

where $F(\lambda)$ is the filter profile, N is the noise spectral density, and $P_{noise-cal}$ is calibrated noise power based on definition. Thus, at step 512, calibrated OSNR is calculated using the tunable optical filter profile $F(\lambda)$. The calibrated OSNR is the value for the output of the monitor 400.

In some embodiments, the DLI phase may be sensitive to temperature fluctuations. An electronic feedback loop may be used to ensure that improved measurement accuracy is achieved under any circumstances. The electronic feedback loop may be implemented by maximizing the power difference between the constructive and destructive ports of the DLI. Active temperature control of the OSNR monitor may also be implemented to stabilize the DLI performance.

Figure 6:
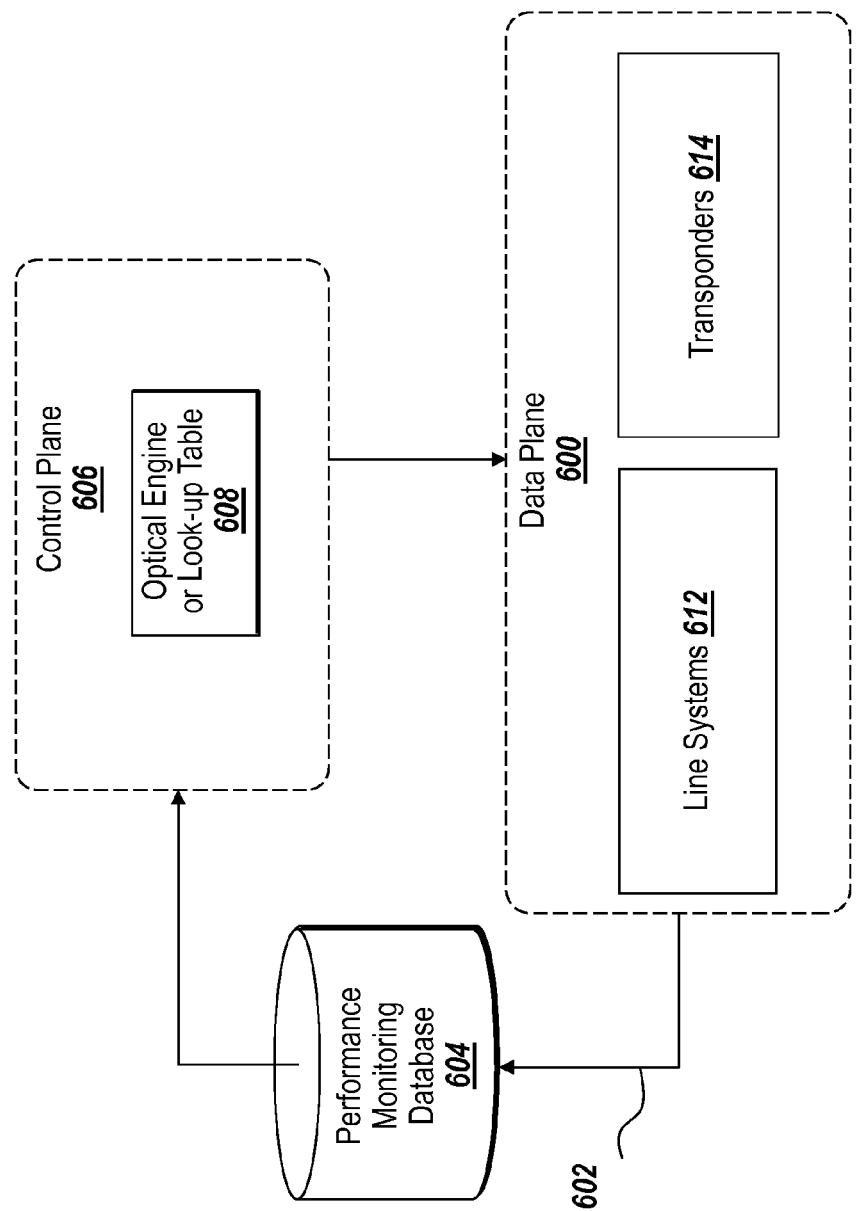
FIG. 6 depicts how the OSNR data may be employed in network management.

FIG. 6 depicts how the calculated real-time OSNR data may be used. In particular OSNR data 602 per channel, per link may be grabbed from the data plane 600 of optical nodes within an optical network. This data 602 may be stored in a performance monitoring database 604 and subsequently used by the control plane of the nodes in the network in performing network management. An optical engine or look up table 608 may be present on the control plane 606. As such, the OSNR measurements may be used in provisioning, monitoring, traffic engineering and failure protection within the optical network. The OSNR monitors can be deployed to continuously sweep across the entire spectrum in operation to collect OSNR values for all channels in real time. The optical engine or look up table 608 may be deployed to figure out which channel on which link can be reconfigured to optimize network performance based on the OSNR data. The control plane 606 may send commands to both the terminal transponders 614 in the data plane 600 and to the line systems 612 in the data plane 600 to carry out the necessary changes on the fly. Exemplary changes implemented by the line systems 612 may include, among other changes, changes to channel center wavelength, channel bandwidth, channel spacing and amplifier gain. Exemplary changes implemented by the terminal transponders 614 may include, among other changes, changes to line-side transmission rate, modulation format, center wavelength and client-line mapping.

Embodiments determine real-time in-service OSNR measurement without disrupting or turning off one or more channels of the network. The OSNR monitor described herein may be integrated with existing optical line systems. The OSNR measurements performed by the OSNR monitors are independent of the modulation format and thus, may work with all phase formats, amplitude format or a combination thereof.

The real-time in-service OSNR data may be used to perform global network optimization to determine the optimal routing and data rate in the optical network. The OSNR data may be used to establish protection and restoration paths for network resiliency and to maximize data throughput.

One or more of the above-described acts may be encoded as computer-executable instructions executable by processing logic. The computer-executable instructions may be stored on one or more non-transitory computer readable media. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media. One or more of the above described acts may be performed in a suitably-programmed electronic device.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless stated otherwise. The conjunction "or" is meant to be inclusive, unless stated otherwise.

It is intended that the invention not be limited to the particular embodiments disclosed above, but that the invention will include any and all particular embodiments and equivalents falling within the scope of the following appended claims.

The invention claimed is:

1. In an optical network, a method comprising:
   tapping off a portion of an optical signal without affecting service in the optical network;
   filtering the portion of the optical signal with an optical filter to select a channel in the signal;
   passing the filtered signal to a delay line interferometer (DLI);
   comparing power at a constructive interference output port of the DLI with power at a destructive interference output port to calculate an optical signal to noise ratio (OSNR) for the channel;
   calculating the OSNR for the channel using the power at the constructive interference output port of the DLI and the power at the destructive interference output port of the DLI; and
   calibrating the calculated OSNR based on a filter profile of the optical filter.

2. The method of claim 1, wherein the optical filter is tunable.

3. The method of claim 1, wherein the DLI is tunable.

4. The method of claim 1, wherein the OSNR is calculated by an OSNR monitor integrated into optical terminal equipment in the optical network.

5. The method of claim 4, wherein the OSNR monitor is compatible with a plurality of different optical networks.

6. The method of claim 1, wherein the calculated OSNR is independent of a wavelength grid spacing of the channel.

7. The method of claim 1, wherein
   calibrating the calculated OSNR includes integrating the filter profile of the optical filter over a passband of the optical filter.

8. In an optical network, a method, comprising:
   measuring an optical signal to noise ratio (OSNR) for a channel of an optical signal for a link using an optical filter and a delay line interferometer;
   reporting the measured OSNR for the link to a network management tool;
   with the network management tool, using the measured OSNR to manage the optical network;
   wherein the measured OSNR is calibrated based on a filter profile of the optical filter.

9. The method of claim 8, wherein the method further comprises using the measured OSNR to determine what data rate the link can support.

10. The method of claim 8, wherein the method further comprises using the measured OSNR to control at least one of provisioning, traffic engineering or failure protection in the optical network.

11. A monitor for measuring an optical signal to noise ratio (OSNR) in an optical signal in an optical network, the monitor comprising:
    an optical filter configured to filter a portion of an optical signal to select a channel in the optical signal without affecting service in the optical network;
    a delay-line interferometer (DLI) configured to measure the OSNR in the optical signal, wherein the DLI includes:
       a constructive interference output port, and
       a destructive interference output port, and
    an OSNR calculation unit configured to calculate the OSNR for the channel using power at the constructive interference output port of the DLI and power at the destructive interference output port of the DLI;
    wherein the OSNR calculation unit is further configured to calibrate the calculated OSNR based on a filter profile of the optical filter.

12. The monitor of claim 11, wherein the optical filter is tunable.

13. The monitor of claim 11, wherein the DLI is tunable.

14. The monitor of claim 11, wherein the monitor is integrated into optical terminal equipment in the optical network.

15. The monitor of claim 11, wherein the monitor is compatible with a plurality of difference optical networks.

16. The monitor of claim 11, wherein the calculated OSNR is independent of a wavelength grid spacing of the channel.

17. The monitor of claim 11, wherein the OSNR calculation unit is further configured to integrate the filter profile of the optical filter over a passband of the optical filter.

18. The monitor of claim 11, further comprising:
    a first photodetector coupled to the constructive output port of the DLI; and
    a second photodetector coupled to the destructive output port of the DLI; wherein the first photodetector and the second photodetector are configured to convert the optical signals to electrical signals.

19. The monitor of claim 11, wherein:
the optical signal includes a signal component and a noise component,
the signal component is output on both the constructive output port of the DLI and the destructive port of the DLI, and
the noise component is split equally between the constructive output port of the DLI and the destructive port of the DLI.

20. The monitor of claim 11, wherein the channel to be filtered is selected based on a center frequency of the optical filter.

* * * * *